(No Model.)

A. GUMMER.
VEHICLE SPRING.

No. 322,924. Patented July 28, 1885.

Witnesses:
George H. Hatch
Burton V. Gummer.

Inventor:
Albert Gummer.

UNITED STATES PATENT OFFICE.

ALBERT GUMMER, OF OMRO, WISCONSIN.

VEHICLE-SPRING.

SPECIFICATION forming part of Letters Patent No. 322,924, dated July 28, 1885.

Application filed May 21, 1884. (No model.)

*To all whom it may concern:*

Be it known that I, ALBERT GUMMER, a citizen of the United States, residing at Omro, in the county of Winnebago and State of Wisconsin, have invented a new and useful Improvement in Vehicle-Springs, of which the following is a specification.

My invention relates to an improvement in the manufacture and construction of that class of vehicle-springs denominated and known as "half-springs;" and it consists in welding or riveting to the primary spring the clip or yoke, coupling the primary and supplemental springs together at a point between the center of the primary spring and its ends, whereby a more simple and effective adaptation of the parts forming the combination than heretofore known and used is obtained.

Figure 1:
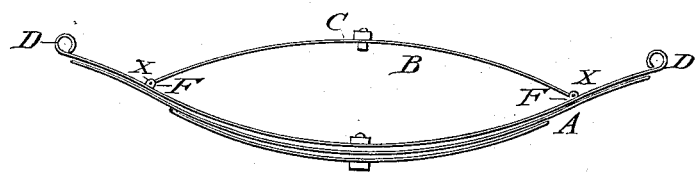
Figure 2:

Figure 1 is a side view of the springs A and B in combination. Fig. 2 is a side view of the supplemental spring B alone.

A is a three-leaved primary half-spring, with an eye, D, at each end of the same, and with projecting ears F welded to either leaf of the spring A at a point between the center of the spring A and its ends. B is a supplemental and semi-elliptical spring, with an eye, H, at its ends corresponding with the ears F, between which the ends of the spring B are secured by the pin or bolt X, running through the same and coupling the springs forming the combination together. C is a depending lug indicating the central point of the spring B, and it and the ends D of the spring A constitute the points of connection with a vehicle-body; but the central point of the spring B being the one to which a vehicle-body is mainly secured, the necessity of a rigid fastening of the ends of the spring B to the spring A will be plain, since it is required that the vehicle-body shall be firmly secured from a longitudinal or lateral play upon its spring according as the latter may be situated upon an axle of a vehicle, and this stability is given by the welding or riveting of the clip or ears F to either leaf of the spring A, in preference to other known but materially different methods of combining a supplemental half-spring with a primary one.

Having described my invention, I claim—

The combination, with the half-elliptic primary spring, having the fixed perforated ears between its middle and each end, of the supplemental spring attached at its ends to the fixed perforated ears described, its middle forming a bearing about in the same plane with the ends of the main spring, substantially as set forth, for the purpose specified.

ALBERT GUMMER.

Witnesses:
GEORGE A. HATCH,
BURTON V. GUMMER.